United States Patent [19]

Patel et al.

[11] Patent Number: 4,707,754
[45] Date of Patent: Nov. 17, 1987

[54] VOICE COIL BALANCED ACTUATOR

[75] Inventors: Shailesh Patel, San Jose; Wolfgang Dirks, Monte Sereno, both of Calif.

[73] Assignee: Apple Computer, Inc., Cupertino, Calif.

[21] Appl. No.: 763,901

[22] Filed: Aug. 7, 1985

[51] Int. Cl.$^4$ .......................... G11B 5/55; G11B 5/012
[52] U.S. Cl. ........................................ 360/106; 360/98
[58] Field of Search ............................ 360/106, 97-99; 310/36, 38

[56] References Cited

U.S. PATENT DOCUMENTS

| | | | |
|---|---|---|---|
| 4,145,725 | 3/1979 | Wallis | 360/106 |
| 4,331,991 | 5/1982 | Morehouse | 360/106 |
| 4,346,416 | 8/1982 | Riggle | 360/97 X |

Primary Examiner—A. J. Heinz
Attorney, Agent, or Firm—Blakely, Sokoloff, Taylor & Zafman

[57] ABSTRACT

A disk drive which includes an actuator motor whose magnets and iron path are mounted on the arm assembly to act as a counter weight. The coil of the actuator motor is mounted to the base of the disk drive with the iron path disposed around the coil and the iron core disposed through the center of the coil and all are mounted on the iron path and face the coils. By utilizing the iron path and magnets as a counterbalance, the total mass of the arm is reduced, reducing the inertia of the arm and of the power requirements of the actuator motor to move the arm.

13 Claims, 9 Drawing Figures

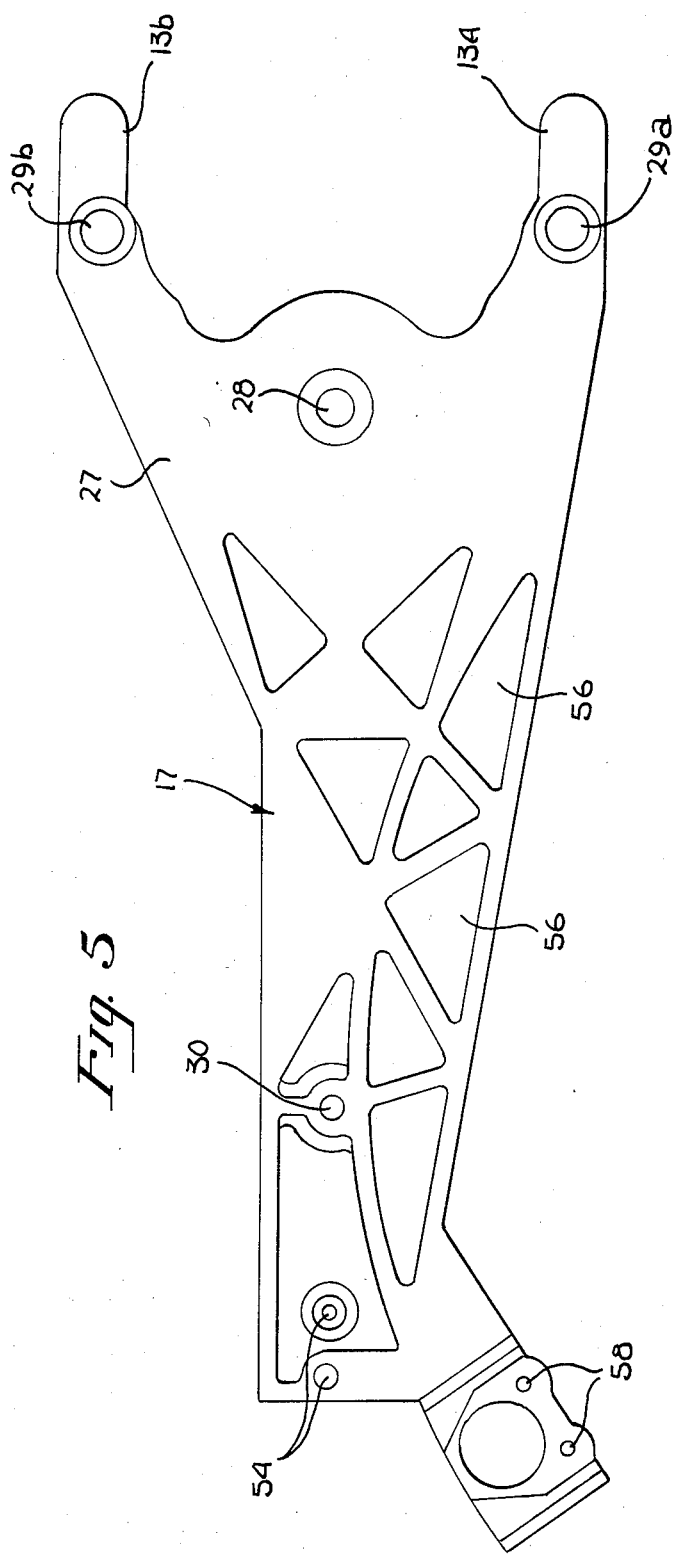
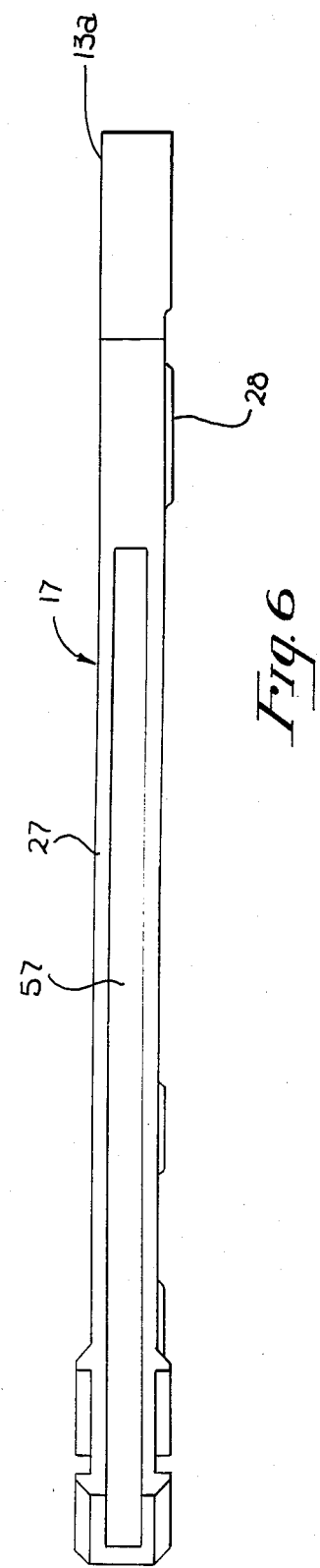

VOICE COIL BALANCED ACTUATOR

BACKGROUND OF THE INVENTION

1. Field of the Invention

This invention relates to the field of actuator motor assemblies for disk drives.

2. Art Background

Hard disk drives use aluminum disks to store blocks of data. The disks have magnetic surfaces and store data in blocks that lie along concentric circular tracks. The data is stored and recovered by read/write heads. These heads do not touch the surface of the disk, but ride on what is known as an "air bearing". Typically the heads are suspended 17-20 microinches from the surface of the disk.

The read/write heads are located on the end of a driver arm whose function is much like the tone-arm of a record player. However, since the heads of a disk drive are not touching the surface of the disk, an actuator motor provides an independent source of motion of the heads across the surface of the disk.

In order to optimize storage capacity, information is stored on both sides of a hard disk. Two heads are mounted on the drive arm, one for each side of the disk. The disk rotates at approximately 3000 rpm and contains a high density of storage tracks. For example, the present invention contemplates a hard disk having 600 tracks per inch.

Hard disk drives are typically used as storage devices for a host computer. When a read/write command is received from the computer, the drive arm is moved across the disk surface, seeking the appropriate track to access. The drive arm is propelled by an actuator motor.

The actuator motor consist of a fixed magnet and a coil attached to the arm. Additional weight is added to the arm to counterbalance the arm, much like the counterweight on a record player tone arm. The driver arm is counterbalanced in order to equalize the moment of each side of the arm. The moment of the portion of the arm extending on one side of the pivot point is dependent on the mass of the portion and the radius through which it acts. By counterbalancing the driver arm, the moments of each side of the pivot point are equal, and the arm can be operated in any plane without the need for complex servo circuitry. When the moment on each side of the pivot point is equal, the arm will not rotate unless additional force is applied to one side. Thus, changes in the plane of the arm, and shocks to the disk drive, will not cause the arm to rotate, reducing the chance of damage during shipping and other movement.

When the driver arm is swept across the surface of the hard disk, a certain amount of inertia is built up in the arm. In order to stop the arm directly over a track, the arm must begin slowing prior to reaching that track, to overcome the inertia. The time spent slowing the arm adds to the access time of the disk drive. The inertia is a function of mass multiplied by the square of the radius through which it acts. A disadvantage of prior art driver arm assemblies is the added mass of the counter balance and the larger radius through which it acts. In prior art disk drives, the counterweight must be placed outside of the coil/magnet structure, increasing the radius and the size of the arm. The increased radius means greater inertia. This added inertia not only reduces the access time, it also requires a more powerful actuator motor using more current to supply the starting and stopping force for the driver arm. A larger motor means higher cost and larger space requirements, while higher current requirements result in additional heat and higher operating costs. Further, the counterbalance limits the reduction in size of the entire disk drive assembly.

The present invention seeks to overcome the disadvantages of prior art driver arms by providing a driver arm which incorporates, as part of its structure, the motor assembly for sweeping it over the disk. Accordingly, the present invention does not require separate counterweights for the driver arm, and a lower power motor may be used. Additionally, the arm can be made a shorter length than prior art driver arms, allowing for more compact disk drives.

SUMMARY OF THE PRESENT INVENTION

The present invention utilizes a driver arm which incorporates, as part of its structure, a motor assembly for sweeping the arm over the disk. The driver arm utilizes the magnet of the motor as a counterbalance, with fixed coils attached to the disk drive housing. The magnet rests in an iron path which forms part of the arm assembly. The result is a driver arm which, because of its reduced mass and corresponding decrease in inertia, decreases the access time for data retrieval and storage. As a result of the structure of the present invention, a smaller motor which uses less current and generates significantly less heat is used to move the arm.

The present invention is realized in a disk drive system which provides storage capabilities to, for example, a host computer. The disk drive includes a hard disk mounted on a spindle which rotates the disk. The disk contains information tracks on each side. These tracks are accessed by read/write heads which are attached to the driver arm. The heads are swept over the surface of the disk by the motor assembly. Connecting cables provide a means of interfacing the disk drive to the host computer. The disk drive is mounted in a low profile housing. A cover on the housing protects the disk drive from environmental contamination.

BRIEF DESCRIPTION OF THE DRAWINGS

FIG. 5 is an expanded view of the arm assembly shown in FIG. 1.

FIG. 6 is a side view of the arm of FIG. 5.

DETAILED DESCRIPTION OF THE INVENTION

A disk drive assembly is described which is particularly suitable for use with hard disks. In the following description, numerous specific parts are described in detail in order to provide a thorough understanding of the present invention. However, it will be obvious to one skilled in the art that the inventive concepts described may be employed without the described embodiments. In other instances, well-known parts have not been described in detail in order not to obscure the present invention unnecessarily.

Figure 1:
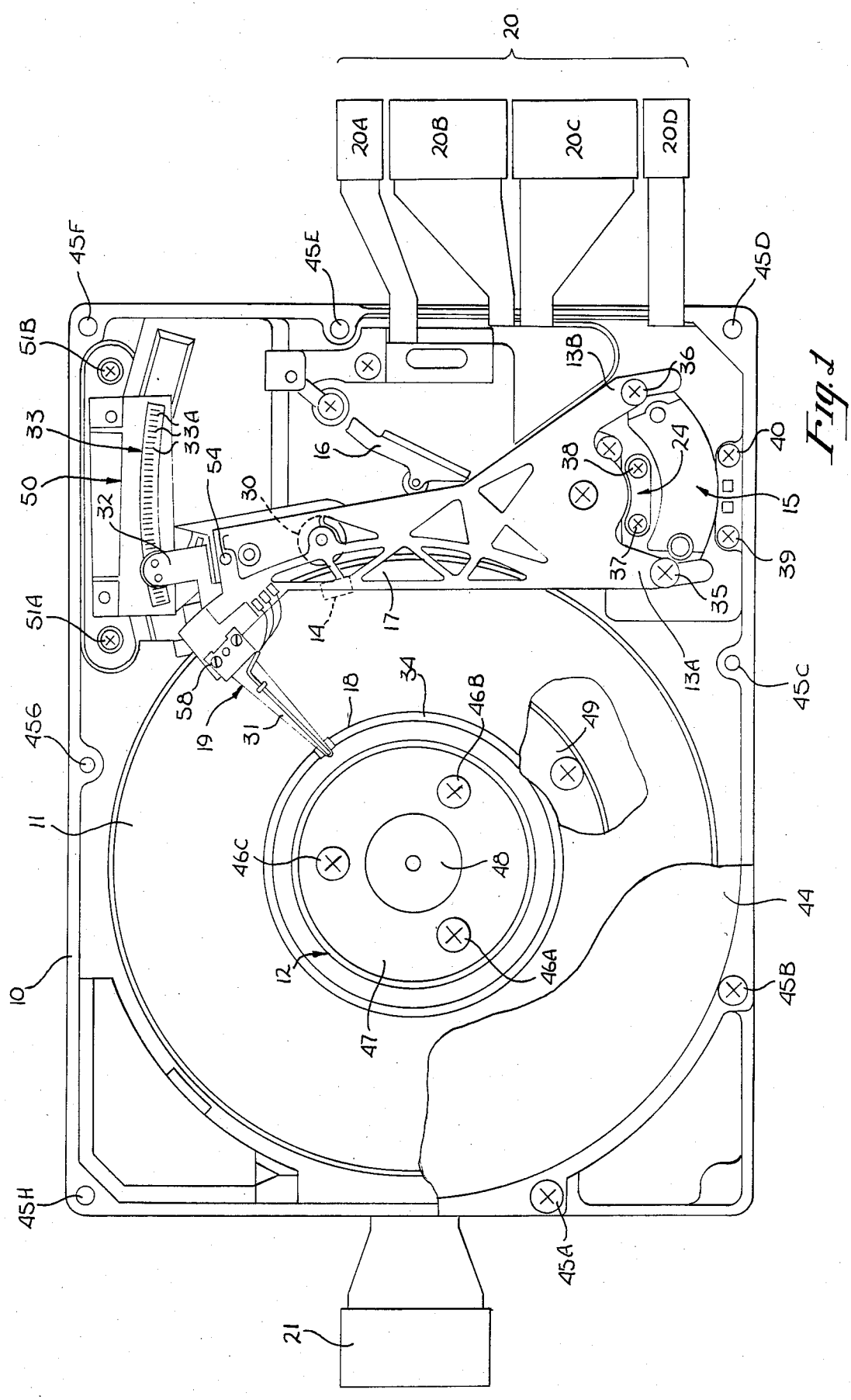
FIG. 1 is a plan view of the invented disk drive showing the arm assembly.

The principal components of the invented disk drive are shown in FIG. 1 and generally comprise:
(1) a base 10;
(2) a hard disk 11;
(3) a spindle 12 holding the disk 11 in place;
(4) a driver arm 17;
(5) head/gimble assembly 19;
(6) connecting cables 20 and 21;
(7) a parking brake 16, and;
(8) an actuator motor assembly 15.

The parking brake 16 is the subject of copending U.S. patent application Ser. No. 763,9339 filed on Aug. 7, 1985 and assigned to the assignee of the present invention.

Base

The base 10 is a metal casting which is a generally rectangular shaped shallow box. All the moving parts of the disk drive assembly are contained within the base 10 with only the connector cables 20A–20D and 21 extending beyond the base. Likewise none of the parts extend above the sides of the box defined by the base. As a result, a cover 44 (partially shown in FIG. 1) can be attached to the base at points 45A–H with screws. The cover 44 can be transparent or opaque, and serves to prevent dust and smoke from reaching the disk mechanism. In addition to the holes 45A–H for attaching the cover 44, numerous other attaching points, bosses and the like are integrally formed with the base 10 and are described below, where pertinent to the present invention.

Hard Disk

In the presently preferred embodiment, the hard disk 11 of FIG. 1, is a 5¼ inch double sided aluminum disk which is used to magnetically store data. Both sides are used for data storage, and are accessed by read/write heads 18. In the preferred embodiment of the present invention, a single disk is utilized for storage of 10 megabytes of information. However, the invention contemplates the addition of additional disks and the use of disks with increased capacity. Data is stored on the disk 11 in concentric rings such as ring 34, shown as an example. In addition to data, each ring also contains "servo" information. This servo information is contained in a single "burst" of data at one location in the ring. Servo information is used to provide the host computer with knowledge of the position of the ring on the disk as well as the position of the read/write heads within the ring itself.

Data is stored digitally, as a series of "0s" or "1s" represented by pulses. A single bit of information is stored in a cell, with a cell defined by a single clock bit. In the preferred embodiment of the present invention, a cell either contains a data pulse representing a logical "1" or "0" and a clock pulse. Data pulses are distinguished from clock pulses by their position in the cell. The determination of the position of the pulse in the cell requires an accurate phase locked loop circuit, as is known in the art. The read/write head must be positioned very accurately when writing information so that during read operations a logical "1" will be properly read as a "1".

Head positioning can be accomplished by "coarse" positioning or "fine" positioning. In coarse positioning, some means of locating tracks, such as a focused LED optic scale system located near the heads, is used to determine when the desired track is approaching. At that point, the actuator motor is commanded to begin braking so that the head comes to rest over the desired track. In order to center the head directly over the desired track, servo information contained in the track itself is used to indicate whether the head is off to the the left or to the right. The actuator motor is then commanded to move in the appropriate direction to center the head exactly. For read operations, coarse positioning is usually sufficient. For write operations, it is desired to write the data in the center of the track, and therefore fine positioning is utilized.

Spindle Motor Assembly

The spindle assembly 12 includes a disk hub 47 which clamps and holds the disk 11. The disk hub 47 is mounted on the shaft 48 which extends through the center of the disk 11 and is attached to the rotor 49. The spindle motor drives the rotor 49 which in turn rotates the disk 11. The spindle motor is controlled by a microprocessor and is not shown in detail, since such devices are well known in the prior art.

Head/Gimble Assembly

Figure 7:
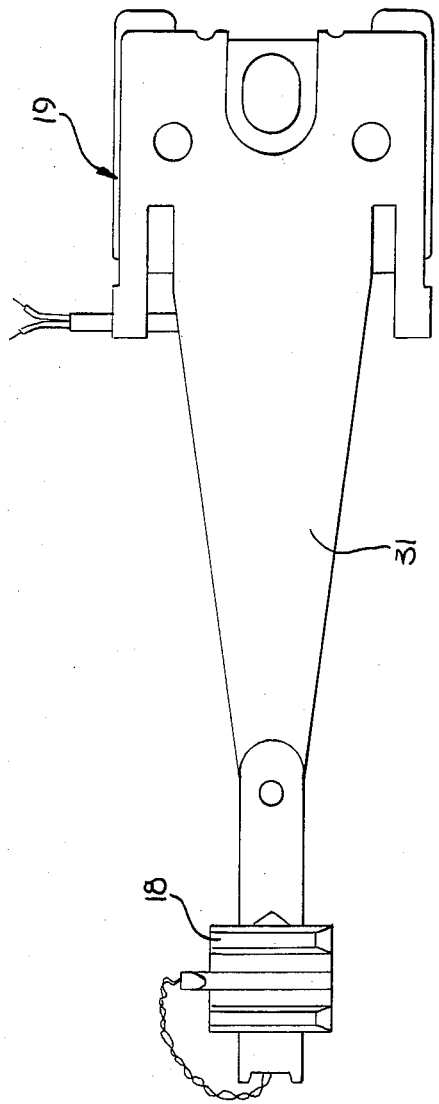
FIG. 7 is a top view of the head-gimble assembly.
Figure 8:
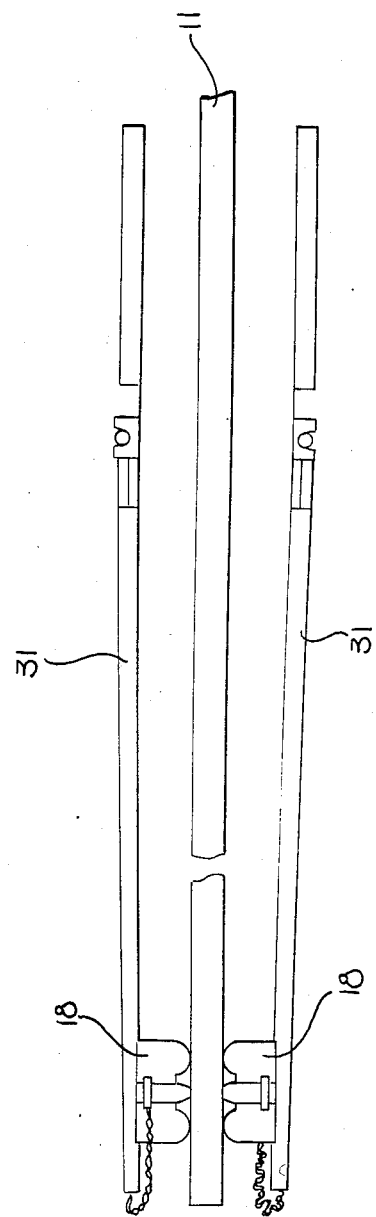
FIG. 8 is a side view of the head-gimble assembly of FIG. 7.

The head-gimble assembly 19 includes read/write heads 18 mounted at the end of the arm 31, and is shown in detail in FIGS. 7 and 8. As seen in FIG. 8, a magnetic head 18 is disposed on either side of the disk 11 and the heads are aligned with each other. The heads 18 do not touch the surface of the disk 11, but ride on an "air bearing" of 17 to 20 microinches of thickness. The need for enclosure of the disk drive assembly becomes most apparent here. The air bearing on which the heads fly is less than half the thickness of a particle of smoke. Should any contamination occur within the head/disk assembly, there is the possibility that it may get caught between the head and disk surface. There it will scratch the disk, destroying data and potentially causing a "head crash" where the head itself contacts the disk. A head crash causes not only permanent damage to an area of the disk, but the loss of data stored in the damaged area as well.

The air bearing is maintained by the speed of revolution of the hard disk 11. Therefore, when power is lost there is a chance of a head crash. The present invention includes tracks near the disk hub 47 where no information is stored. These tracks act as a parking area for the heads 18. Whenever a power-off condition occurs, the parking brake 16 pushes the arm 17 and therefore the heads 18, to the parking tracks.

The heads 18 are disposed on either side of the disk so that information may be read and stored on both sides of the disk. The heads are attached to the end of the gimble arm 31, which is generally comprised of metal. As shown in FIG. 1, the gimble arm 31 is mounted on the drive arm 17 at point 58. The gimble arm 31 is disposed along a radius of the disk with the heads mounted on the end of the gimble arm 31 so that they are disposed over a data track at all points along the radius of the disk. The head defines a "skew" angle with the tangent of each track. This angle changes as the head accesses tracks at different points along the radius of the disk. A focused optic device which is used to count tracks and allow "coarse positioning" of the head assembly may be mounted beside the heads 18. The heads are connected to a single chip microcomputer which directs positioning. The microcomputer uses information from the optics to count the tracks and position the heads.

Cables

The disk drive interfaces with a host computer through cables 20A-20D and cable 21. Cable 21 carries signals from the motor control circuit to the spindle motor to regulate the speed of the motor within 1% of the desired RPM.

The brake 16 is powered from the driver circuit board and receives signals on cable 20A.

Read/write commands and data transfers are carried by cables 20B and 20C while cable 20D controls the operation of the actuator motor.

Optics Scale

Figure 9:
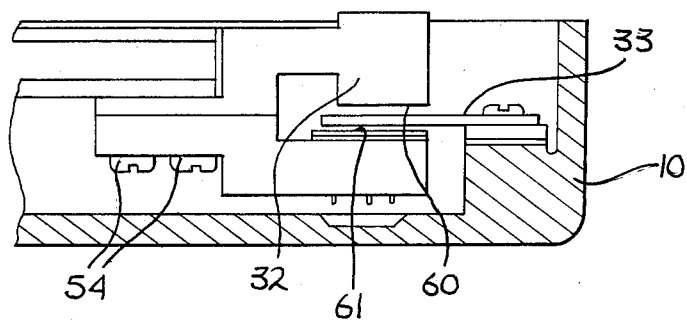
FIG. 9 is a cross sectional view illustrating the optic scale system of FIG. 1.

Referring to FIG. 1, the scale 50 comprises a generally rectangularly shaped glass or other transparent material attached to the base 10 with screws 51A and 51B. The scale 50 includes a slotted member 33. A collimated LED 32 is disposed about member 33. The LED 32 is attached to the arm 17 at point 54. The LED travels freely over member 33 during movement of the drive arm 17. The scale 50, as its name implies, provides a track location on the disk. The slotted member 33 contains openings 33a, which are used to enable tracks to be located on the disk 11. As shown in FIG. 9, the LED 32 is disposed on either side of slotted member 33. A light beam is passed between opposing faces 60 and 61 of the LED 32. This beam is interrupted by the solid material between slots in member 33. When the beam is over a slot, a circuit is completed and a signal whose magnitude depends on the amount of light reaching the lower face 61 is produced. The beam of light passing between faces 60 and 61 is approximately the same width as a slot of member 33. If only a portion of the light passes through a slot, a smaller signal is produced. Thus, as the LED 32 travels over a slot, a sinusoidal wave form is produced with a peak when the beam is directly over a slot. A certain point along the wave form may be defined as the point at which the center of a data track is accessed by the read/write heads 18. In this manner, the tracks may be located quickly and easily. Additionally, during movement of the read/write heads, the peaks can be counted, so that desired tracks may be found.

Drive Arm

As shown in FIG. 5, the arm 17 is a straight member having a generally U-shaped section 27 at one end and openings 54 and 58 at the other end. Openings 29a and 29b in either leg of the "U", serve as points of attachment for the actuator motor assembly. Openings 54 serve as points of attachment for the optic scale system. The arm 17 pivots about point 28 which is an opening for mounting the arm on a pivot means. The pivot means is not shown in detail since such means are well known in the prior art.

The arm 17 swings the heads back and forth over the surface of the disk 11. The arm 17 is prevented from swinging the heads beyond the inner radius of the disk 11 by the crash stop 14 (shown in FIG. 1). The crash stop 14 is a raised member extending from the base 10 below the disk 11. An elastic bumper 30 on the arm 17 contacts the stop 14 and prevents further movement. At this point the heads are disposed over a parking track. In order to prevent the arm from swinging beyond the outer radius of the disk 11, the parking brake 16 is situated so that, in its deactivated mode, the arm contacts it at a point at which the heads still lie over the surface of the disk 11.

Presently, the arm 17 is generally comprised of aluminum. As has been described above, one end of the arm is generally U-shaped and is used to mount the iron path and magnets as a counterbalance for the arm. The other end of the arm 17 includes opening 58 for mounting the head/gimble assembly 19 (shown in FIG. 1). The arm itself is disposed generally in line with a tangent to the hard disk with the head/gimble assembly extending along a radius of the disk. As shown by area 57 in FIG. 6, the arm is open along its length between the upper and lower surfaces, in order to reduce mass and minimize inertia, and additionally allows the arm to extend somewhat over the disk without contacting the disk. Triangular shaped indentations 56 are formed in the arm 17 to further reduce the mass of the arm without adversely affecting the structural integrity. In the preferred embodiment, arm 17 is formed by casting and after machining has a mass of approximately 23g. The total mass of the arm in the preferred embodiment with the magnet assembly and the head/gimble assembly attached is approximately 80g.

During operation, an actuator motor is used to swing the driver arm through an arc about pivot point 28. To move the arm, the actuator motor must be powerful enough to overcome the mass of the arm. Additional forces which would result from the arm moving in a vertical plane about pivot 28 are reduced by balancing the driver arm. In the prior art, this was accomplished by applying a counterweight on the end of the arm, much in the same manner as a counterweight is used to balance a tone arm on a record player. However, although the counterweight balanced the arm, it added to the total mass of the arm assembly and extended to a radius beyond the coil/magnet assembly, adding to the inertia of the driver arm. In order to overcome the added inertia, a more powerful actuator motor was required. A more powerful actuator motor not only requires more power (i.e., current) and gives off more heat, it is also bigger and heavier and adds to the size of the disk drive.

The present invention eliminates the need for an added counterweight by incorporating the actuator motor into the arm assembly so that the actuator motor acts as a counterweight.

Actuator Motor

As shown in FIGS. 1 through 4, the actuator motor is comprised of an iron path 22, magnets 23 attached to that path, a voice coil assembly 24 and an iron core 25.

Figure 2:
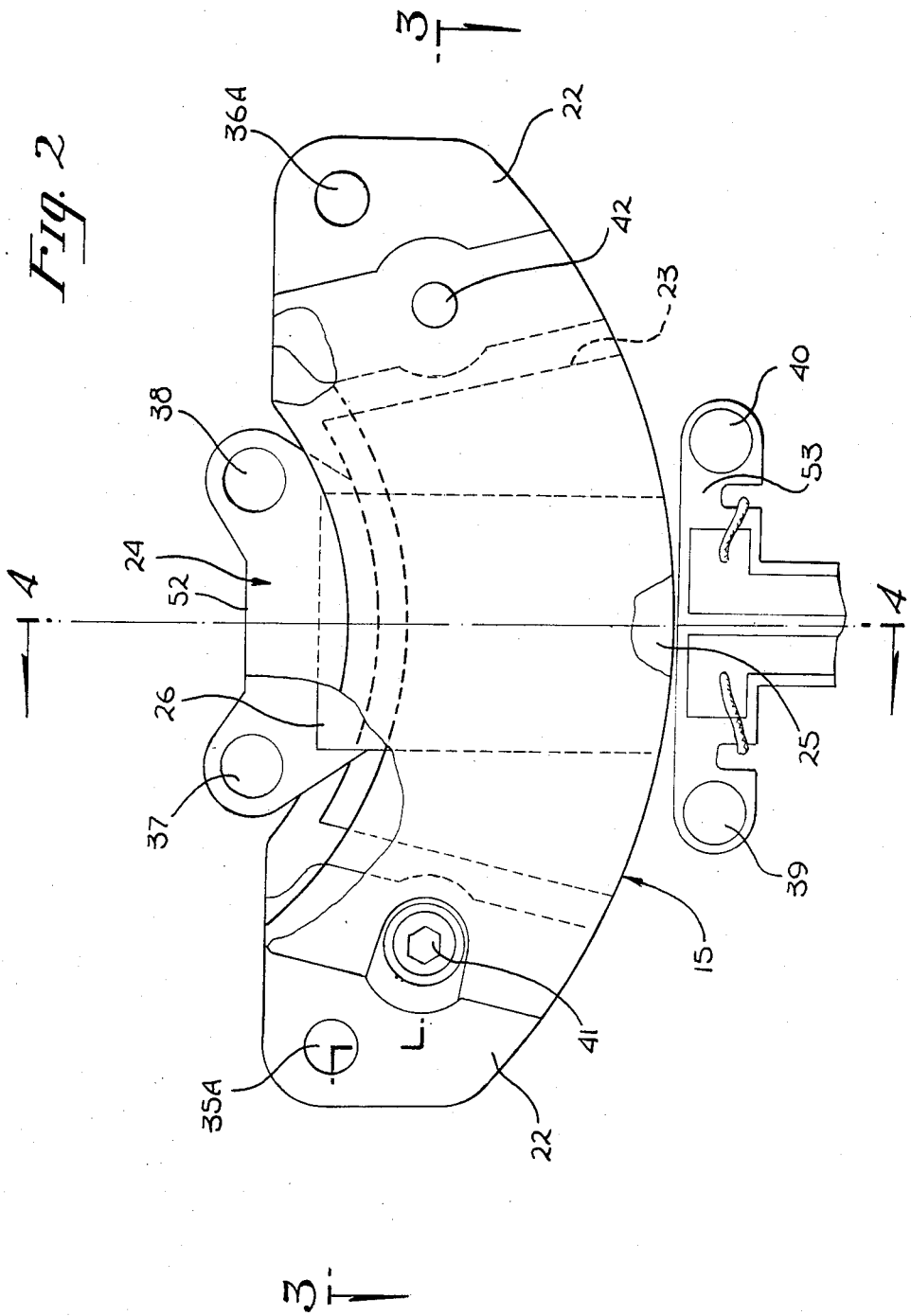
FIG. 2 is an expanded plan view of the voice coil assembly of the arm shown in FIG. 1.
Figure 4:
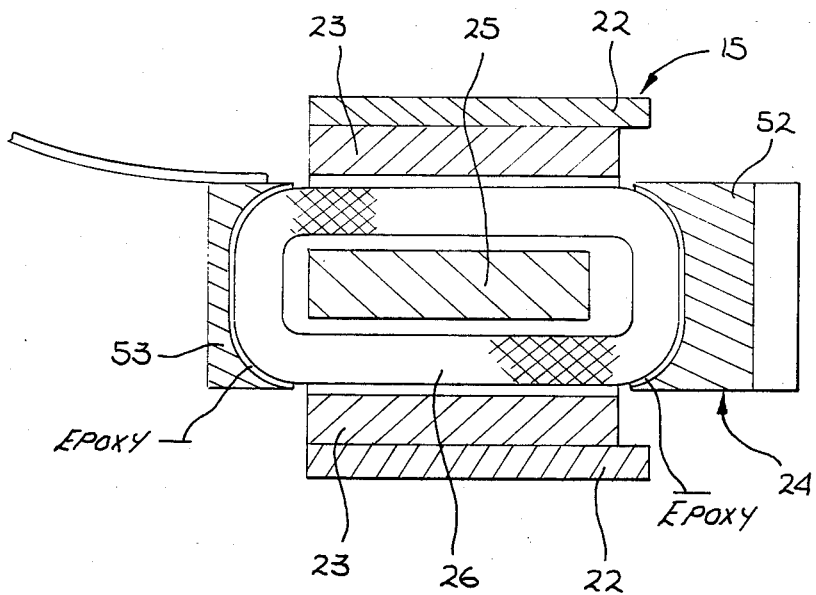
FIG. 4 is a cross-sectional view of the coil assembly of FIG. 2, generally taken through section line 4—4 of FIG. 2.

The voice coil assembly 24 in the present invention is fixed to the base 10 of the disc drive. (In prior art disk drives, the coil was attached to the arm and magnets were fixed to the base.) The coil assembly 24 includes winding 26 consisting of an oval shaped ring of copper wire. In the preferred embodiment, the winding has 238 turns and 7 layers (34 turns per layer). The winding has a resistance of approximately 3.8 Ohms. As shown in FIG. 4, the winding 26 is mounted with epoxy at each end to brackets 52 and 53, which attach the voice coil assembly 24 to the base 10 of the disk drive. As shown in FIGS. 1 and 2, the coil 24 is mounted on the base with screws 37 through 40.

The cross section of the voice coil, shown in FIG. 4, is generally oval shaped with an opening through the center thereof. The opening is to allow the core 25 to pass freely within the coil and consequently is larger than the core 25. When mounted on the base 10, there is clearance between the coil assembly 24 and the floor of the base 10. A portion of the iron path and magnets will extend through this space as well as above the coil assembly 24 as shown in FIG. 4.

Figure 3:
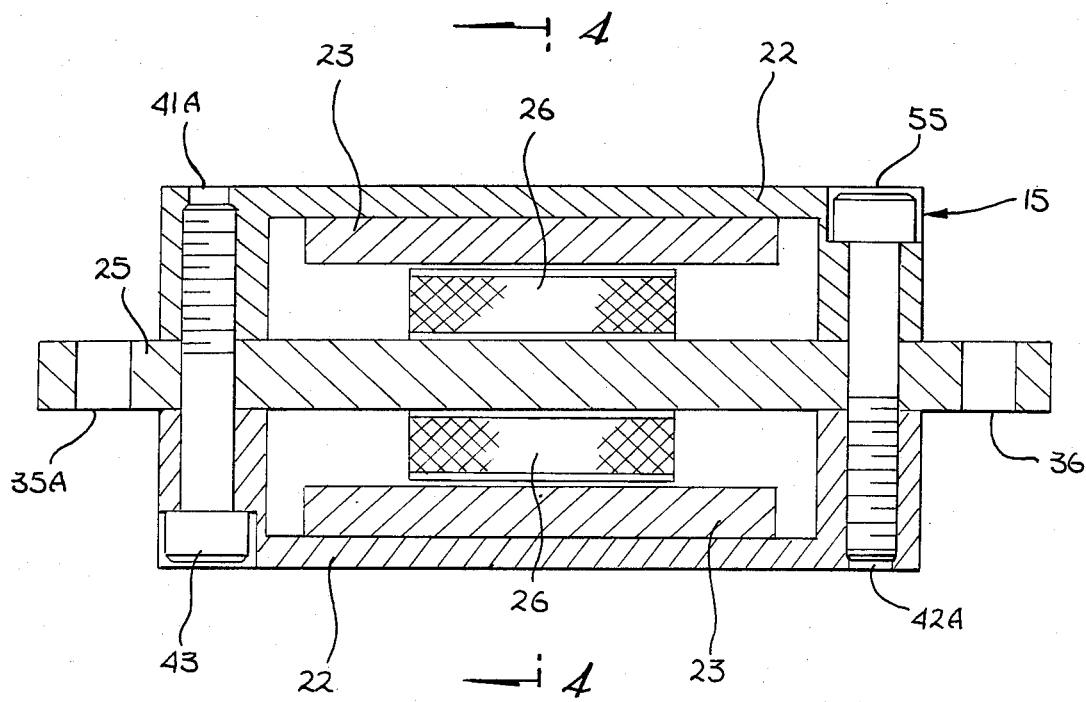
FIG. 3 is a cross-sectional view of the coil assembly of FIG. 2, generally taken through section line 3—3 of FIG. 2.

The core 25 of the voice coil assembly is comprised of iron and is shaped as a curvilinear rectangle. Presently, four openings are defined in the core 25. Openings 35a and 36a are used to attach the core to the arm 17 by passing screws 35 and 36 through openings 29a and 29b of the arm and openings 35A and 36A of the core respectively. The remaining two openings 41 and 42 are used to attach the iron path 22 to the core 25. These openings line up with openings 41a and 42a in the iron path. Bolts 43 and 55 are inserted into the openings 41a and 42a respectively as a means of attaching the iron path 22 to the core 25. These bolts are inserted in opposite directions in either hole as shown in FIG. 3 with bolt 43 pointing towards the top of the figure and bolt 55 pointing to the bottom. As previously mentioned, the core 25 is mounted such that it passes through the center opening of the voice coil 24. During movement of the arm, the core 25 moves back and forth through the coil, in response to the electromagnetic field which results when current is passed through the coil.

The iron path 22 is a box-like structure extending over the upper and lower surfaces of the core 25. As shown in FIG. 3, the cross section of the iron path 22 is that of a rectangular box. In the embodiment shown, the iron path 22 is smaller in width than the core 25. The iron path 22 is generally disposed between the U-shaped extensions 13A and 13B of the arm 17. The iron path is mounted asymmetrically to the pivot point, as opposed to prior art actuator motor assemblies mounted symmetrically about the pivot point. The iron path 22 is not connected directly to the arm 17, but is attached to the core 25 which is mounted on the arm. As shown in FIG. 1, the iron path is mounted such that it is disposed over the windings 26 of the coil assembly 24. As can be seen in FIG. 3, the iron path also extends beneath the coil assembly as well.

Flat magnets 23 are fixed to the inner, upper and lower faces of the iron path 22. In the preferred embodiment, the magnets are comprised of somarium cobalt. The magnets and iron path are of a weight sufficient to balance the arm 17.

The actuator motor functions in the following manner. The magnets 26 create a perpendicular magnetic field between them. The core 25 rests in this magentic field. When current is fed to the windings 26 of the coil assembly 24, the core 25 is subject to a motor force whose magnitude is proportional to the current in the windings. The motor force then causes movement of the core 25, and thus of the entire arm. The direction of motion depends on the direction of current flow in the winding 26. To reverse the direction of travel, the direction of current is simply reversed. Thus by controlling the direction and magnitude of the current in the windings, the speed and direction of the movement of the arm can be controlled.

Thus, a hard disk drive has been described which permits access to both sides of a disk. The magnets and iron path of the actuator motor are used as a counterbalance for the drive arm, reducing its weight and inertia and reducing the size of the motor required to move the arm. Although the present invention has been described with reference to FIGS. 1-8 it will be appreciated that the Figures are for illustration only and do not limit the scope of the present invention.

We claim:

1. An actuator motor for positioning and conterbalancing a pivotally mounted arm assembly comprising:
    a base;
    a coil having spiral windings and a central opening passing through said spiral windings, wherein said coil is mounted on said base;
    a core disposed to pass freely through said central opening and to move in a back and forth motion; said core coupled to said arm assembly and providing a magnetic flux path; wherein when current is passed through said coil inducing an electromagnetic field, said arm assembly is caused to move in accordance with said back and forth motion of said core;
    a ferrous member coupled to said core and disposed to complete said magnetic flux path;
    a plurality of magnets mounted on said ferrous member, wherein said ferrous member and said magnets provide said counterbalancing of said arm assembly.

2. The actuator motor as described by claim 1 wherein said magnets are disposed between said coil and said ferrous member.

3. The actuator motor as described by claim 2 wherein said magnets are comprised of somarium cobalt.

4. The actuator motor as described by claim 2 wherein said arm assembly includes a gnerally U-shaped member with openings therein for attaching said core to said arm assembly.

5. The actuator motor as described by claim 2 wherein said base forms a portion of a housing for a hard disk drive.

6. A counterbalanced arm and motor assembly comprising an arm pivotally mounted and adapted to rotate about a pivot point in response to activation of said motor, said motor having a coil which has spiral windings and a central opening passing through said spiral windings, wherein said coil is fixedly mounted relative to said pivot point and an iron and magnet assembly having an iron core mounted to said arm, said iron core being disposed through said central opening of said coil such that said iron core moves freely through said central opening when an electromagnetic field is induced by current flowing in said windings, said iron core moves in a back and forth motion relative to said central opening and causing said arm to pivot, said iron and magnet assembly positioned about said pivot point such that the center of gravity of said iron and magnet assembly and said arm is located substantially at said pivot point so as to counterbalance said arm about said pivot point.

7. A disk drive comprising:
    a base;
    a drive assembly engaging and rotating at least one disk, said drive assembly mounted to said base;

at least one magnetic head mounted on said arm assembly for detecting signals stored on the surface of said disk, said magnetic head also for producing signals on said disk;

an actuator motor mounted on said base and coupled to said arm for producing radial movement in said arm about a pivot point, said actuator motor comprising: a coil having spiral windings and a central opening passing through said spiral windings; a core disposed to pass freely through said central opening and to move in a back and forth motion relative to said central opening when an electromagnetic field is induced by current flowing in said windings; said arm coupled to said core, wherein movement of said core causes said arm to move radially; a ferrous member coupled to said core to provide a magnetic flux path; and a plurality of magnets mounted on said ferrous member, wherein said ferrous member and said magnets also function to counterbalance said arm about said pivot point.

8. The disk drive as described by claim 7 wherein said motor is disposed on an opposite end of said arm from said magnetic head.

9. The disk drive as described by claim 8 wherin said drive assembly includes a spindle and spindle motor, said disk being mounted on said spindle, said spindle motor rotating said disk and said spindle.

10. The disk drive as described by claim 7 wherein said arm includes a generally U-shaped member at one end with openings thereon for mounting onto said core and said arm having a central slot which permits said disk to be disposed freely in said slot such that a pair of magnetic heads coupled to said arm and disposed on each side of said disk provides information transfer on both sides of said disk.

11. The disk drive as described by claim 7 wherein an optical system is used to provide positioning information to a controlling means coupled to said actuator motor, said optical system comprising an optical sensor means attached to said arm adjacent to said head and an optical scale means attached to said base, said optical scale means having graduates slots and spaces, said optical sensor means being disposed about said optical scale means such that as said arm pivots said optical sensor means is disposed alternatively adjacent to one of said slots in said optical scale and one of said spaces, said optical sensor sending a corresponding signal to said controlling means, said controlling means determining the radial position of said arm from the number of said slots and spaces encountered by said optical sensor.

12. The disk drive as described by claim 11 wherein said optical sensor comprises a focused LED.

13. The disk drive as described by claim 11 wherein said controlling means comprises a single chip microcomputer.

* * * * *

UNITED STATES PATENT AND TRADEMARK OFFICE
CERTIFICATE OF CORRECTION

PATENT NO. : 4,707,754
DATED : 11/17/87
INVENTOR(S) : Patel et al.

It is certified that error appears in the above-identified patent and that said Letters Patent is hereby corrected as shown below:

| COLUMN | LINE | | |
|---|---|---|---|
| 03 | 20 | delete "763,9339" | insert --763,933-- |
| 08 | 40 | delete "gnerally" | insert --generally-- |
| 09 | 26 | delete "wherin" | insert --wherein-- |

Claim 07 after line 04, insert --an arm assembly pivotally mounted on said base for radial movement--

Signed and Sealed this

Ninth Day of January, 1990

*Attest:*

JEFFREY M. SAMUELS

*Attesting Officer*  *Acting Commissioner of Patents and Trademarks*